United States Patent [19]

Daniel et al.

[11] Patent Number: 4,915,440
[45] Date of Patent: Apr. 10, 1990

[54] TRUCK BED COVER

[76] Inventors: Avis U. Daniel; Sallye R. Jones, both of 10666 Scotland Ave., Apt. #14042, Baton Rouge, La. 70807

[21] Appl. No.: 320,514

[22] Filed: Mar. 8, 1989

[51] Int. Cl.[4] .............................................. B62D 25/06
[52] U.S. Cl. ..................................... 296/104; 296/105
[58] Field of Search ............... 296/104, 105, 100, 159; 135/88

[56] References Cited

U.S. PATENT DOCUMENTS

| 160,792 | 3/1875 | Saunders | 296/104 |
|---|---|---|---|
| 1,827,059 | 10/1931 | Woolcott | 296/105 |
| 2,565,746 | 8/1951 | Turner | 296/104 |
| 4,310,194 | 1/1982 | Biller | 296/159 |

Primary Examiner—Robert R. Song
Attorney, Agent, or Firm—Jerry T. Kearns

[57] ABSTRACT

A truck bed cover for the cargo area of trucks utilizes a flexible cover supported by a plurality of generally U-shaped rigid supports. The flexible cover is secured by cooperating snap fasteners spaced around the truck bed and the U-shaped supports may be formed with collapsible telescoping leg portions to allow the height of the cover to be adapted for covering various different cargos. The supports are retractable to a collapsed position when not in use. The cover may also be utilized to form a tent in the truck bed for the protection of individuals from the environment. The cover may be removed and utilized for various picnic and camping uses.

1 Claim, 5 Drawing Sheets

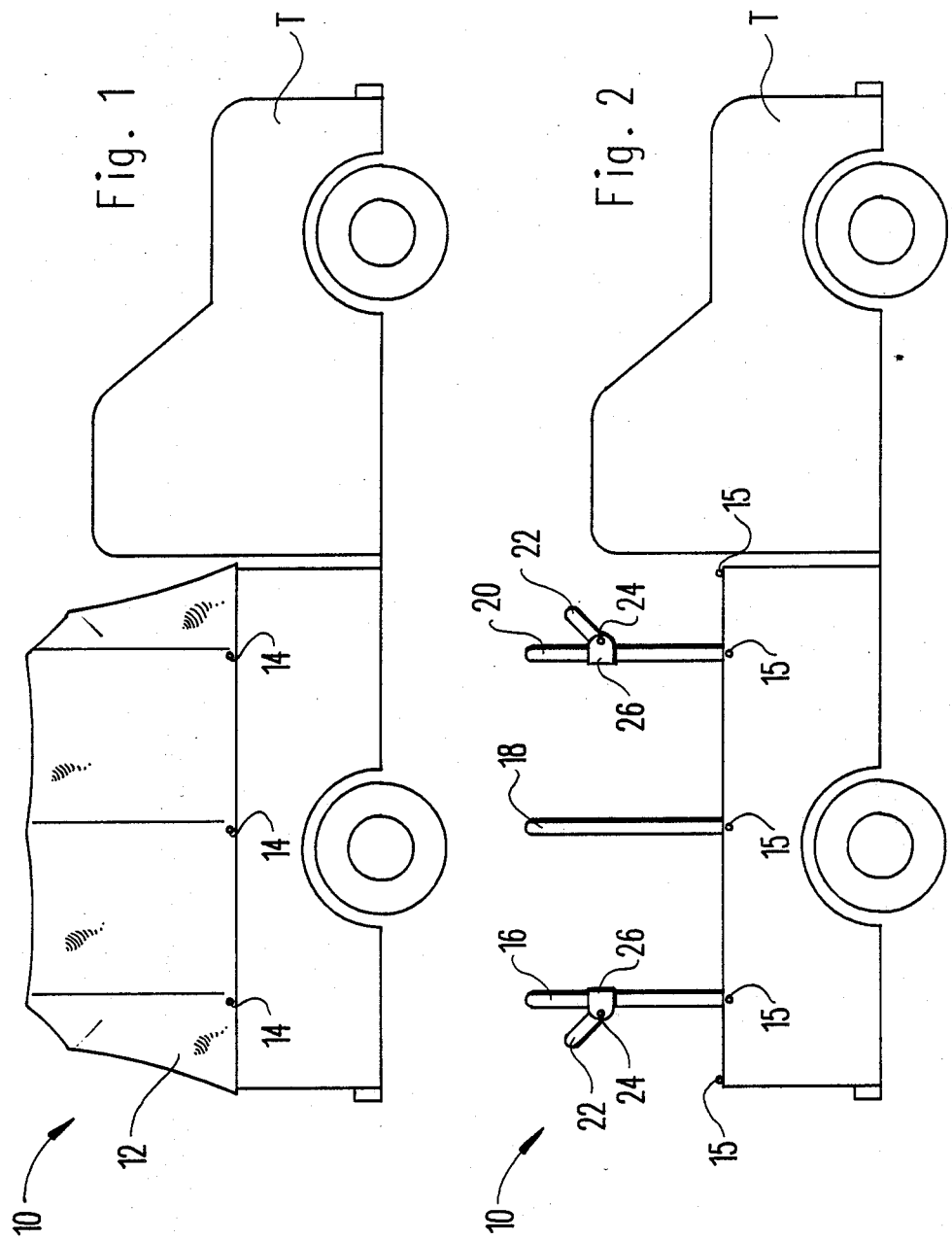

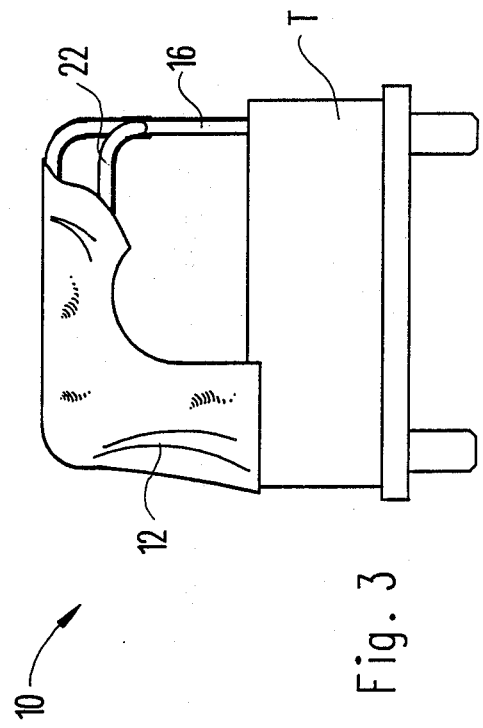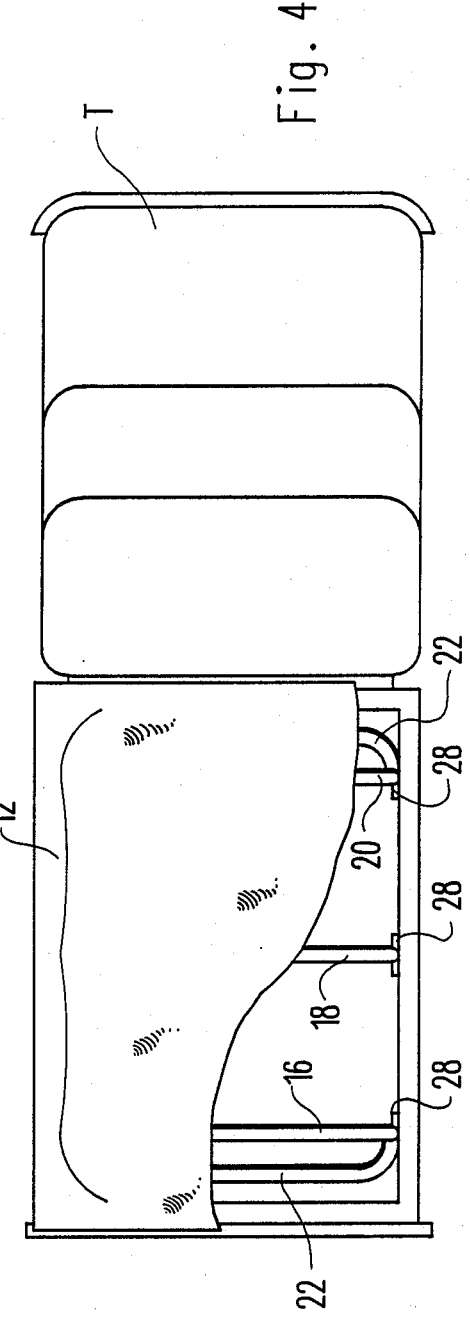

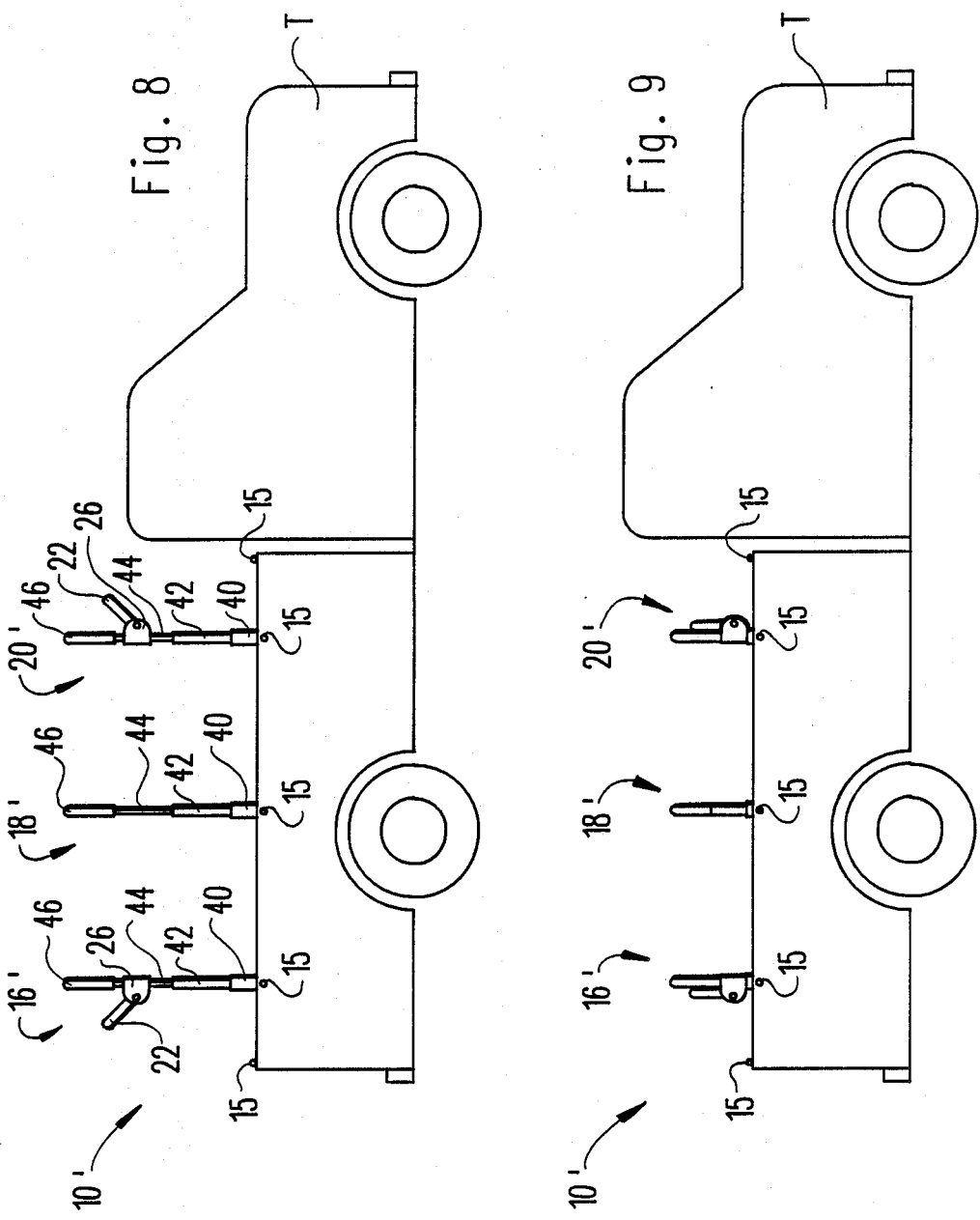

TRUCK BED COVER

BACKGROUND OF THE INVENTION

1. Field of the Invention

The present invention relates to truck bed covers, and more particularly pertains to a flexible cover for the open cargo area of trucks. The cover is particularly adapted for use with pick-up trucks, but may be formed in various sizes and dimensions for use with large flat bed trucks. A wide variety of truck bed covers utilizing various collapsible and retractable supports are known in the prior art. The present invention seeks to provide an adjustable support system for adapting the height of the cover to accommodate various different cargos and additionally utilizes secondary support members to form a tent for the protection of individuals from the environment.

2. Description of the Prior Art

Various types of truck bed covers are known in the prior art. A typical example of such a truck bed cover is to be found in U.S. Pat. No. 4,289,346, which issued to N. Bourgeois on Sept. 15, 1981. This patent discloses a collapsible protective cover for a truck bed which utilizes a plurality of supports mounted in truck members for movement between retracted and extended positions along the length of a truck bed. U.S. Pat. No. 4,310,194, which issued to J. Biller on Jan. 12, 1982, discloses a tent camper for a pick-up truck which utilizes a plurality of pivotally collapsible supports for supporting a flexible cover. Snap fasteners are provided for securing the cover to the truck bed. U.S. Pat. No. 4,639,034, which issued to J. Amos on Jan. 27, 1987, discloses a collapsible soft top for use on pick-up truck cargo compartments. A frame formed by a plurality of girders and rafters is collapsible when an open cargo compartment is desired. The frame is covered by a flexible flap fabric material. U.S. Pat. No. 4,709,956, which issued to L. Bowman on Dec. 1, 1987, discloses a removable cover for a pick-up truck bed which utilizes a plurality of inverted U-shaped frames supporting a windowed vinyl canopy. U.S. Pat. No. 4,738,274, which issued to W. Heath on Apr. 19, 1988, discloses a cap for covering the cargo area of a pick-up truck which includes a fabric cover and a readily assembled and disassembled tubular frame.

While the above mentioned devices are suited for their intended usage, none of these devices disclose a truck bed cover which utilizes a plurality of spaced U-shaped rigid supports, with the forward most and rearward most supports each provided with a secondary pivotal arcuate rigid support bar for supporting a flexible fabric cover. An additional feature of the present invention, not contemplated by the aforesaid prior art devices is the provision of telescoping leg sections on each of the spaced U-shaped supports to allow height adjustment of the flexible cover to accommodate various different cargos. Inasmuch as the art is relatively crowded with respect to these various types of truck bed covers, it can be appreciated that there is a continuing need for and interest in improvements to such truck bed covers, and in this respect, the present invention addresses this need and interest.

SUMMARY OF THE INVENTION

In view of the foregoing disadvantages inherent in the known types of truck bed covers now present in the prior art, the present invention provides an improved truck bed cover. As such, the general purpose of the present invention, which will be described subsequently in greater detail, is to provide a new and improved truck bed cover which has all the advantages of the prior art truck bed covers and none of the disadvantages.

To attain this, representative embodiments of the concepts of the present invention are illustrated in the drawings and make use of a truck bed cover for the cargo area of trucks having a flexible cover supported by a plurality of generally U-shaped rigid supports. The flexible cover is secured by cooperating snap fasteners spaced around the truck bed and the U-shaped supports may be formed with collapsible telescoping leg portions to allow the height of the cover to be adapted for covering various different cargos. The supports are retractable to a collapsed position when not in use. The cover may also be utilized to form a tent in the truck bed for the protection of individuals from the environment. The cover may be removed and utilized for various picnic and camping uses.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Pat. and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved truck bed cover which has all the advantages of the prior art truck bed covers and none of the disadvantages.

It is another object of the present invention to provide a new and improved truck bed cover which may be easily and efficiently manufactured and marketed.

It is a further object of the present invention to provide a new and improved truck bed cover which is of a durable and reliable construction.

An even further object of the present invention is to provide a new and improved truck bed cover which is susceptible of a low cost of manufacture with regard to both materials and labor, and which accordingly is then susceptible of low prices of sale to the consuming public, thereby making such truck bed covers economically available to the buying public.

Still yet another object of the present invention is to provide a new and improved truck bed cover which provides in the apparatuses and methods of the prior art some of the advantages thereof, while simultaneously overcoming some of the disadvantages normally associated therewith.

Still another object of the present invention is to provide a new and improved truck bed cover which utilizes a plurality of spaced U-shaped supports for supporting a flexible fabric cover on the cargo area of a truck.

Yet another object of the present invention is to provide a new and improved truck bed cover utilizing spaced U-shaped supports, with the forward most and rearward most supports each provided with a secondary pivotal support bar for supporting a flexible fabric cover.

Even still another object of the present invention is to provide a new and improved truck bed cover which is adjustable in height to accommodate various different cargos.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of the truck bed cover of the present invention installed on a truck.

FIG. 2 is a side view of the support frame of the truck bed cover installed on a truck, with the flexible cover removed.

FIG. 3 is a rear end view, partially cut away, illustrating the truck bed cove of the present invention.

FIG. 4 is a top view, partially cut away, illustrating the truck bed cover of the present invention.

FIG. 8 illustrates the support frame according to a slightly modified second embodiment of the present invention.

FIG. 9 illustrates the modified support frame in a retracted position.

DESCRIPTION OF THE PREFERRED EMBODIMENT

Figure 7:
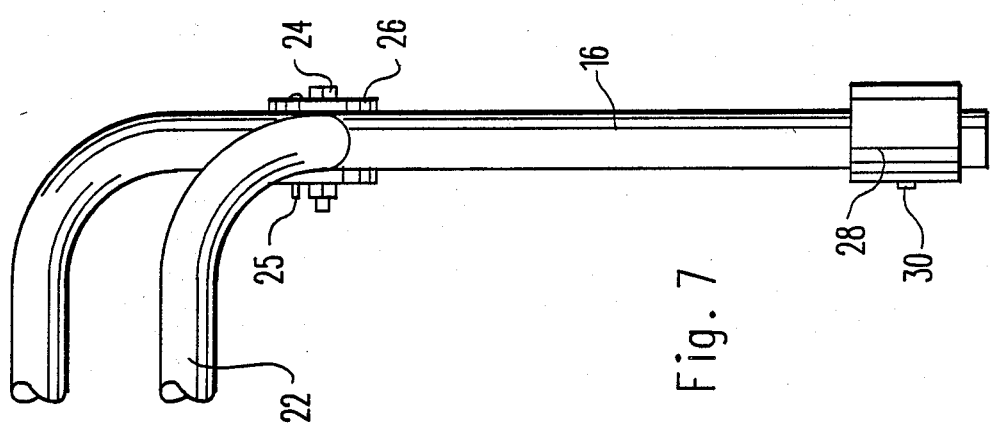
FIG. 7 is a front view of the rigid support.

With reference now to the drawings, and in particular to FIG. 1 thereof, a new and improved truck bed cover embodying the principles and concepts of the present invention and generally designated by the reference numeral 10 will be described.

More specifically, it will be noted that the first embodiment 10 of the invention includes a flexible cover 12 secured by a plurality of snap fasteners 14 spaced about the peripheral edge thereof. The flexible cover 12 is illustrated in an operative position disposed over the cargo area of the bed of a conventional pick-up truck T. It should be noted that while the preferred embodiment is described with respect to use on a pick-up type truck, the flexible cover 12 and underlying support members may be formed in a wide variety of different dimensions for use with flat bed and other type trucks.

FIG. 2 illustrates a side view of the truck T with the flexible cover removed, revealing the underlying supports. Three spaced generally U-shaped supports 16, 18 and 20 are spaced along the length of the truck bed. As illustrated, the truck bed area is provided with a plurality of spaced snap fasteners 15, for cooperation with the snap fasteners 14 on the cover 12 illustrated in FIG. 1. The rearward most support 16 is provided with a secondary pivotal U-shaped support bar 22 secured to a U-shaped bracket 26 on the support 16 by a pivot bolt 24. The opposite end of the support bar 22 is secured in a similar fashion on the opposite leg of the support 16. The forward most support 20 is provided with a similar secondary arcuate support bar 22 secured by a pivot bolt 24 and a bracket 26.

FIG. 3 illustrates a rear end view of the truck bed cover 10, with the flexible cover 12 partially cut away.

FIG. 4 illustrates a top view of the truck bed cover 10, with the upper portion of the flexible cover partially cut away to illustrate the underlying supports. The leg portions of each of the spaced supports 16, 18 and 20 are secured to an interior wall of the truck bed by brackets 28.

Figure 5:
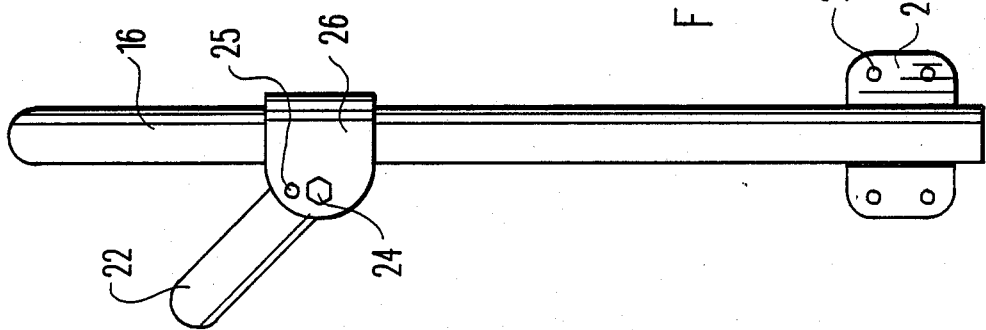
FIG. 5 is a side view illustrating the construction of one of the spaced rigid supports.

As shown in FIG. 5, the bracket 28 surrounds the lower leg portion of the support 16 and is provided with a plurality of apertures 29 for the reception of fasteners to secure the bracket 28 to the interior wall of the truck bed. The U-shaped bracket 26 surrounds the upper leg portion of the support 16 and may be secured thereto by welding or other suitable fastening means. The pivot bolt 24 extends through opposed leg portions of the bracket 26 and through the arcuate secondary support bar 22. A pivot pin 25 also extends through both opposite legs of the bracket 26 and through an aperture formed through the bar 22. By removing the retaining pin 25, the bar 22 may be folded to a collapsed position.

Figure 6:
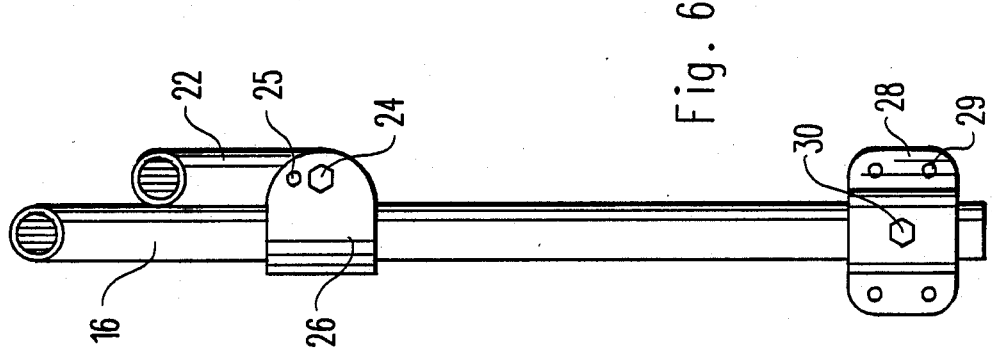
FIG. 6 is an opposite side view of the spaced rigid supports.

As shown in FIG. 6, the lower leg portion of the support 16 is clamped by a bolt 30 within an arcuate bite portion of the clamp 28. By loosening the bolt 30, the leg portion of the support 16 may be axially adjusted with respect to the position of the fixed clamp 28.

FIG. 7 further illustrates the construction of the support 16. It should be noted that the forward most support 20 illustrated in FIG. 2 is similarly constructed.

FIG. 8 illustrates a modified supporting arrangement 10' for the flexible truck bed cover 12 illustrated in FIG. 1. Three supports 16', 18' and 20' are spaced along the length of the bed of the truck T. Each of the spaced supports include a plurality of telescoping sections 40, 42 and 44. A rigid U-shaped transverse member 46 is secured to the upper section 44. The rearward most support 16' and the forward most support 20' are provided with an arcuate secondary support bar 22, as described previously with respect to the first embodiment 10.

FIG. 9 illustrates the spaced support member 16', 18' and 20' in a fully retracted position. As may now be understood, by adjusting the axial extent of each of the supports 16', 18' and 20', the height of the cover may be adjusted to accommodate various different cargos. It is additionally contemplated that the cover may serve as a camper tent or as a canopy for the protection of individuals riding the bed of the truck T.

Figure 10:
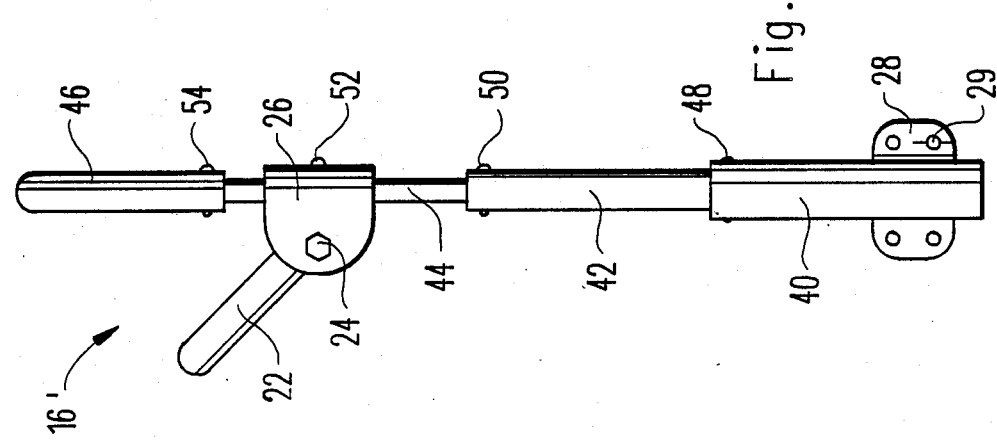
FIG. 10 is a side view illustrating a support member of the modified frame in an extended position.

FIG. 10 illustrates a side view of the support 16'. It should be understood that the supports 18' and 20' are similarly constructed, with the exception that the secondary support member 22 and bracket 26 are omitted from the intermediate support member 18'. Additionally, it should be noted that while the preferred embodiment has been described with reference to the use of three spaced supports, a greater number of supports may be utilized if required, depending upon the dimensions of the truck bed. Each of the support members, for example 16', includes a lower section 40 which is adjustably secured within the clamp 28. An intermediate telescoping section 42 is adjustably received within the lower section 40 and is secured in an adjusted position by a retaining pin 48. An upper section 44 is similarly received within the intermediate section 42 and is retained in an adjusted position by a retaining pin 50. The bracket 26, which pivotally mounts the secondary arcuate support 22, is mounted for adjustable movement along the length of the upper section 44 by a retaining pin 52. The transverse rigid U-shaped shaped support bar 46 is secured by a retaining pin 54 to the upper end of the top support leg section 44 by a retaining pin 54.

Figure 11:
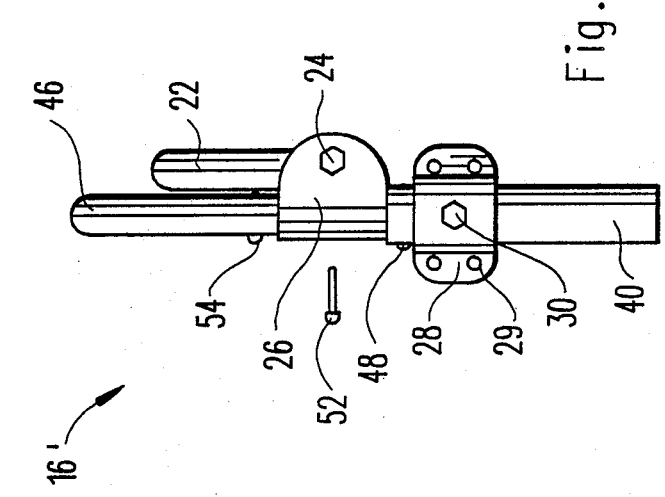
FIG. 11 illustrates the modified support member in a retracted position.

FIG. 11 illustrates a side view of the support member 16' in a completely retracted position. Note that by loosening the clamp bolt 30, the lower section 40 may be axially adjusted.

Figure 12:
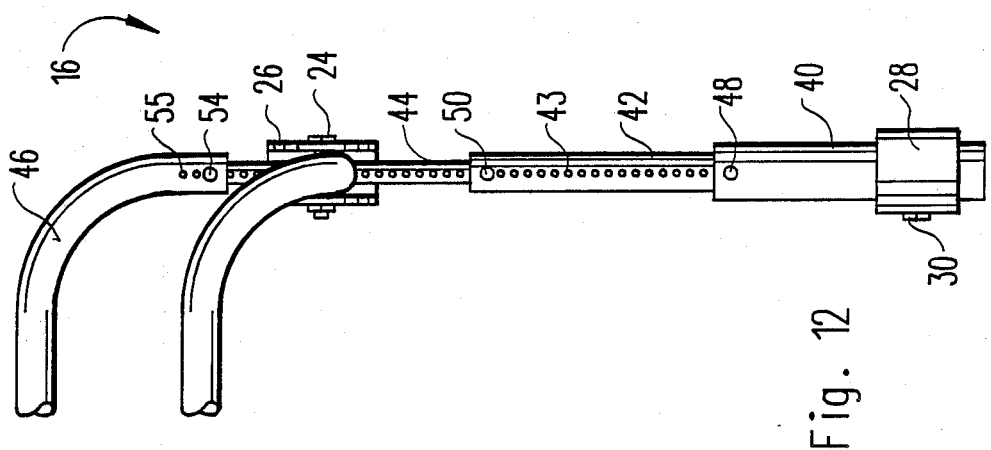
FIG. 12 is a front view illustrating the modified support member in an extended position.

FIG. 12 illustrates an end view of the support 16' which shows the spaced apertures 43, 45 and 555 provided for the selective reception of the retaining pins 48, 50 and 54.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A truck bed cover for covering cargo loads, comprising:
   a plurality of generally U-shaped rigid supports;
   means for mounting said supports in spaced relation along the length of a truck bed;
   each of said plurality of generally U-shaped rigid supports having collapsing leg portions;
   said collapsing leg portions each formed by a plurality of telescoping sections;
   forward most and rearward most ones of said supports each provided with a secondary pivotal arcuate rigid support bar;
   bracket means mounting each of said secondary support bars to said telescoping sections for independent pivotal angular and vertical elevational adjustment with respect to each other and to said U-shaped supports;
   a flexible cover supported over said plurality of supports and dimensioned for covering the truck bed;
   a plurality of spaced cooperating snap fasteners on said cover and the truck bed for securing said cover;
   first retaining pin means for securing said secondary supports in selected discreet angular positions;
   second retaining pin means for retaining said secondary supports in selected discreet vertical elevational positions;
   and third retaining pin means for securing said telescoping sections in selected discreet positions, whereby said U-shaped rigid supports are mounted for vertical adjustment with respect to the truck bed, independently of said secondary supports, to allow adaptation of said cover for various different cargo load dimensions.

* * * * *